(12) United States Patent
Pawelzik et al.

(10) Patent No.: US 6,390,125 B2
(45) Date of Patent: May 21, 2002

(54) VALVE SYSTEM ESPECIALLY FOR A SANITARY FIXTURE

(75) Inventors: Manfred Pawelzik, Soest; Hans-Jürgen Ludewig, Rinteln; Wolfgang Gebhardt, Menden; Hartwig Philipps-Liebich, Hemer, all of (DE)

(73) Assignee: Friedrich Grohe AG & Co. KG, Hemer (DE)

( * ) Notice: Subject to any disclaimer, the term of this patent is extended or adjusted under 35 U.S.C. 154(b) by 0 days.

(21) Appl. No.: 09/768,855

(22) Filed: Jan. 24, 2001

(30) Foreign Application Priority Data

Feb. 9, 2000 (DE) .......................................... 100 05 946

(51) Int. Cl.$^7$ ................................................ E03C 1/04
(52) U.S. Cl. ................ 137/605; 4/623; 4/677; 137/801; 251/297
(58) Field of Search ..................... 4/623, 677; 137/605, 137/801; 251/297

(56) References Cited

U.S. PATENT DOCUMENTS 5,351,347 A * 10/1994 Kunkel .......................... 4/623
6,003,170 A * 12/1999 Humpert et al. ................ 4/623

FOREIGN PATENT DOCUMENTS

DE 43 40 713 6/1995

* cited by examiner

Primary Examiner—Gerald A. Michalsky
(74) Attorney, Agent, or Firm—Herbert Dubno

(57) ABSTRACT

A manually-operated valve is provided in series with an electromagnetically-operated valve and the manually-operated valve is provided with a proximity detector connected to the electronic controller whereby a switch in the manually-operated valve, in one position of the single control lever therefor, corresponding to about 50% of maximum supply rate, is operated to activate the proximity sensor and enable the water flow to be controlled by an object within its detection range. Removal of the object, e.g. the hand of the user from the range, will shut off the water through the manually-operated valve. Outside the position of the lever at which the switch is operated, the proximity detector is ineffective and control is effected exclusively by swinging the lever.

14 Claims, 2 Drawing Sheets

VALVE SYSTEM ESPECIALLY FOR A SANITARY FIXTURE

FIELD OF THE INVENTION

Our present invention relates to a valve system, especially for a sanitary fixture, of the type in which a lever-operated valve can be actuated to control the flow through a water outlet, the lever having a detent by which the lever is releasably retained at a certain opening angle.

BACKGROUND OF THE INVENTION

It is advantageous with certain sanitary fixtures to provide lever-operated valves which are indexed at a certain point in the opening process with a detent which can be overcome by further movement of the lever, the detent being effective to retain the lever-operated member in an engaged position at a certain opening angle corresponding to a certain flow rate of the valve.

Such a valve system is described, for example, in German open application DE 43 40 713 A1.

With the detent arrangement described in this publication, the user cannot unconsciously move the lever into a maximum opening position and thus there can be conservation of water if only because the user is reminded of the position of the lever when that detent engages. Of course, the detent can be overcome so that if the user desires, the flow rate can be increased and the detent can also be overcome to swing the lever back into the closing position.

OBJECTS OF THE INVENTION

It is therefore the principal object of the present invention to provide an improved valve system for a water outlet and especially for a single-lever faucet as used for sanitary fixtures in which there can be a further reduction in water consumption and/or an increase in the user comfort with respect to the faucet use.

Another object is to provide an improved lever-operated water control for sanitary fixtures whereby disadvantages of earlier systems can be avoided.

SUMMARY OF THE INVENTION

These objects and others which will become apparent hereinafter are attained, in accordance with the invention by providing, in the indexed position of the lever, an electronic or electrical control for the water flow so that in this position the water flow can be controlled by a contactless sensor, i.e. a proximity detector, whereas in other angular positions of the lever, the electrical control of the flow rate is cut out.

More particularly, the valve system of the invention can comprise:

a lever-operated valve having a housing provided with a central axis and formed with the water outlet, at least one water inlet communicating with the housing, a valve member in the housing between the inlet and the outlet, and a control lever swingable on the housing along a path about a pivot axis transverse to the central axis;

a detent member in the housing formed with a detent opening along an arcuate path of the lever;

a spring-loaded detent body bearing on the member and engaging in the opening upon displacement of the lever about the pivot axis to a predetermined angular position in opening of the valve; and electric circuitry responsive to angular displacement of the lever and including:

at least one further valve in series with the lever-operated valve for controlling outflow from the outlet, an electrical control for the further valve, a contactless detector operatively connected to the electrical control for maintaining the further valve open for a duration determined by activation of the detector, and a switch in the housing connected with the control for rendering the detector effective in the predetermined angular position of the lever and rendering the detector ineffective in angular positions of the lever other than the predetermined angular position for control of the outflow by the lever-operated valve without limitation by the further valve.

The contactless detector may respond to any part of the body of the user or to an object and the valve system can be used as a single-lever faucet for a sink or some other fixture. In the case of a sink, the proximity detector may be effective to detect the use of the user whereas the valve system can also be used for a bidet, toilet or other sanitary fixture to respond to other body parts.

According to a feature of the invention, the lever-operated valve may be a single-lever mixing valve which may control the proportions of hot and cold water discharged from the water outlet.

The electrical switch may be aligned with the detent opening and the detent body may be a spring-loaded body like a ball carried by the lever. The ball and its spring can be received in a hollow screw threaded into a threaded bore of the lever. The detent opening, in turn, may be a bore in a hard metal plate along the arcuate path or track of the lever and the ball can ride on that plate. A stainless steel plate is preferred. The switch can have an actuating element coaxial with the detent bore and by means of which the switch can be operated. The front end or region of the detent body or ball can extend through the detent opening and actuate the switch via the actuating element.

Preferably the detent body engages in the detent opening at a position of the lever which corresponds to 50% of the maximum flow rate (flow volume per unit time) of the valve system.

The further valve can be a pilot valve operated by the electrical control and a corresponding pilot valve can be provided for each of the hot and cold water supplies. Preferably a twin pilot valve is provided with the hot and cold valves in a common housing and synchronized for joint operation by the electrical control. A single pilot can be provided for that purpose.

The valve system of the invention thus has an advantage that with relatively simple means, at a desired position of the control lever, usually corresponding to half the maximum flow, the actual outflow of the valve can be controlled by the proximity or contactless detector so that water consumption will then be automatically reduced when the water is not necessary. In the detent position, moreover, the contactless control of the outflow increases the comfort level since actual manipulation of the lever, of course, the outflow is controlled exclusively manually by the lever.

The valve system can therefore be a so-called single-hand mixer which not only regulates the flow rate but also the ratio of mixing of cold and hot water although that can be achieved by other means such as, for example, rotation of a handle. With a single actuating member, both the mixed water temperature and the flow rate per unit time can be controlled and the water outlet regulated by the proximity detector at a given flow rate of the system. Of course the system is also applicable just to control the flow rate in a simple water tap application.

BRIEF DESCRIPTION OF THE DRAWING

The above and other objects, features, and advantages will become more readily apparent from the following description, reference being made to the accompanying drawing in which.

SPECIFIC DESCRIPTION

The faucet system shown in FIG. 1 can be considered to be mounted on a sink and to have its detecting device or proximity sensor responsive to the presence of the hand of a user below the spigot or outlet of the sink faucet. The valve can be used for sink, washbasin and, indeed, any sanitary fixture in which a mixing faucet is usable and in which control of the outflow is desirable and in which a conservation of water can be effected by opening and closing flow in response to a body part.

Figure 1:
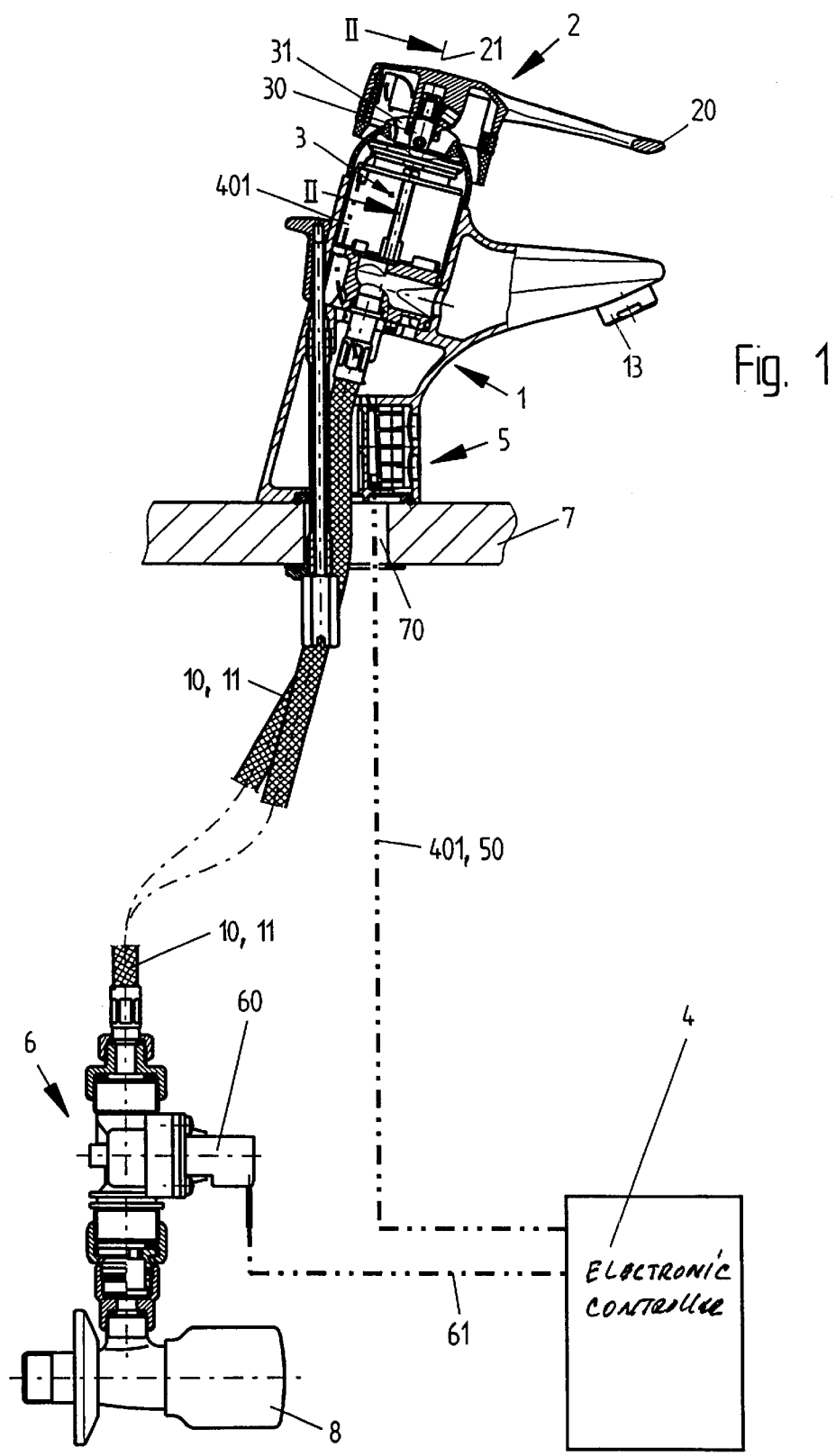
FIG. 1 is a faucet system of the type which can be mounted on a sink, showing the single-lever mixing faucet with its electronic controls detected and the valves operated by the controls in a schematic illustration.

The system shown in FIG. 1 comprises a faucet body 1, a lever head 2 and a valve 3 for mixing the hot and cold water and controlling the volume rate of flow. The system also includes the control electronics 4, a detecting device 5, referred to here as a contactless or proximity sensor and the connecting lines 10, 11 for supplying the hot and cold water to the lever-operated valve. The apparatus also comprises valves 6 operated by electronic circuitry.

The faucet housing 1 with the detecting device 5 is provided above the washbasin in the region of an opening 70 in a conventional manner. The two lines 10 and 11 for the hot and cold water are passed through the opening 70 and the valves 6 communicate with these lines 10, 11 and with the outlet sides of the elbow valves 8 only one of which is visible in FIG. 1 and which serve to connect the hot and cold water lines to the hot and cold distribution piping of the building.

As noted, in the drawing only one of these elbow valves 8 has been shown, the second elbow valve being behind the one shown and below the plane of the drawing.

The hand-actuated valve 3 is provided with a standard cartridge valve system encased in a cartridge housing and retained conventionally in the faucet body 1. A control lever 30 extends from the region of the cartridge housing and is connected with the lever head 2. For the manual operation of the valve, a residual projecting handle 20 is provided.

The valve 3 is so configured that with an up and down pivoting action of the handle 20, the control lever 30 slides in a pivot track 31 or along that pivot path to adjust the outflow per unit time. A rotary movement of the lever head 2 about the central axis 21 of the faucet adjusts the mixing ratio of the cold and hot water supplied to the faucet and thus the temperature of the mixed water discharged form the spigot 13.

In FIG. 1 the single-lever mixer is shown in an intermediate mixing position which blocks the outflow of water and yet corresponds to equal parts of hot and cold water. If the lever 20 is raised from this position, the outflow of water is permitted so that a stream of mixed hot and cold water can flow from the spigot. By a rotation about the central axis 21, the temperature of the discharged water can be adjusted in a stepless manner. At an angular position of the handle 20, corresponding to about 50% of maximum output, in the path 31 there is a detent recess 311 in the form of a bore with a spherical periphery as can be seen from FIG. 2. On a side wall of the path 31, a plate 310 of a hard material, for example, stainless steel, is arranged against which a body 300 is biased by a spring 301. The body 300 is a ball.

The ball 300 and its spring 301 are received in a hollow screw 302 which is threaded into the threaded bore 303 of the control lever 30. The hollow screw 302 forms a detent unit with the spring 301 and the ball 300. The thread in the bore 303 is so configured that a certain difficulty in tightening the screw is provided as the unit is screwed into the bore, thereby ensuring an automatic adjustment of the screw depth for the actuation of the valve 3.

On the opposite side of the plate 310 from the control lever 30, an electric switch 40 is arranged in the faucet housing and is provided with an actuating element 400 coaxial with the indexing or detent opening 311 and which only can move to a limited axial extent. The electric switch 30 can thus be actuated by the forward portion of the body 300 when it engages in the indexing position in the recess 311 of the plate 310, and projects through this recess. The lever is thus indexed in position and in this indexed position the switch 40 is actuated. Outside the indexing position, the switch 40 is unactuated and the electric circuit through the switch is interrupted.

The electric switch 40 is connected by an electric line 401 passing through the opening 70 with the electric controller 4 which may be a microprocessor-based program controller. In a similar manner, the proximity detector 5 is connected by an electric line 50 also passing through the opening 70 with the electronic controller 4. The electronic controller 4, which may be battery-powered or powered by lines current, is connected via an electric line 61 with the electromagnetic effector of the pilot or servovalve 60 which is provided in each of the two lines 10 and 11 and is received in a single valve body 6. The valve 6 thus may be a twin valve for both the hot and cold water and both passages of which can be operated by a single electromagnetic operator as represented at 60. In any event both passages are controlled synchronously for the pilot or servovalve.

Figure 2:
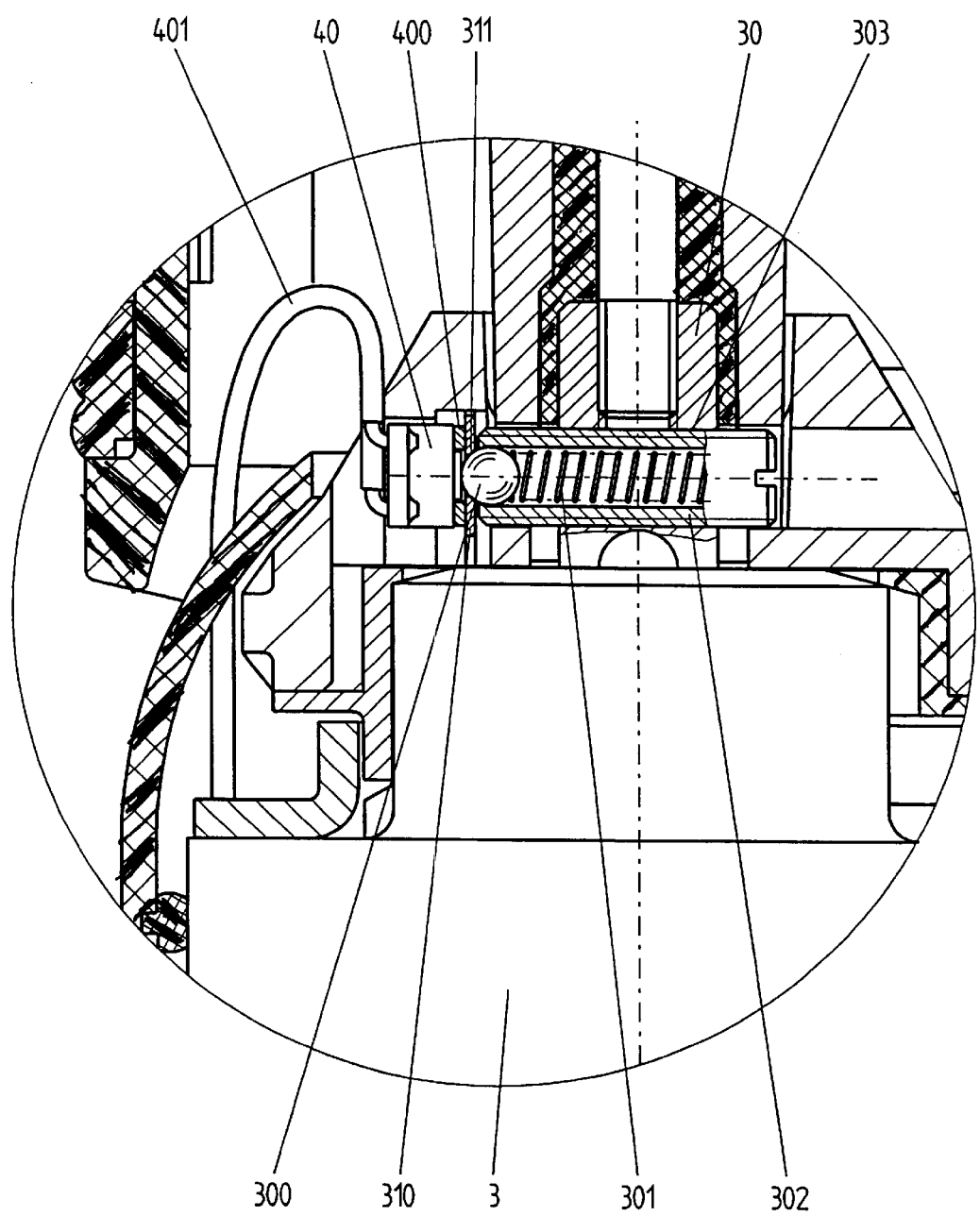
FIG. 2 is a section in a plane II, drawn to an enlarged scale, of a portion of the single-lever valve of FIG. 1.

In the position shown for the control lever 30 in FIG. 2, the ball 300 actuates the switch 40 which switches on the electronic controller 4 or activates the latter.

The switching on of the electronic controller 4 activates the proximity detector 5 and in the absence of a hand or other object in the detection field of this activator, will block the valves 6 via the electromagnetic pilot or servovalve 60.

The detector 5 can be any proximity detector capable of detecting the presence of an object such as the hand of a user in the operating range, usually below the outlet or spigot 13. An infrared proximity detector is preferred for this purpose.

The proximity detector transmits an electric signal to the electronic controller 4 which opens the pilot valve 60 and thus the flow paths in valve 6 for the hot and cold water which can flow at the rate set by the handle or lever 20 and with a proportion of hot and cold water determined by the angular position of that handle about the axis 21.

When the object is withdrawn from the detector range, the valve 6 is closed and outflow through the spigot 13 is terminated. Only when the object, e.g. the hand, again enters the detection range, will the water be free to flow at the rate and temperature selected by the lever head 2.

When the body 300 is removed from the detent opening 311 by a swinging movement of the lever 30, the switch 40 is open circuited, i.e. out of the circuit and the pilot valve 6, 60, is open so that the flow rate per unit time and the mixing ratio and hence the temperature are controlled exclusively by the hand-operated valve 3. The proximity detector 5 is in that case inactive. The hand-operated valve 3 can then adjust the flow rate or the mixing ratio and hence the temperature.

Of course the invention is also applicable to valve systems which control volume rate of flow only, i.e. do not control mixing of water at two different temperatures and it will be understood that the electronically-controlled valve 6, 60 can be provided in series with the manually-operated valve 3 either upstream as is preferred or downstream therefrom.

While the electronic controller has been shown separate here from the housing of the manually-operated valve, it may be integrated therein and the energy supply for the electromagnetic valve can also be by battery in the electronic controller or by connection to a supply network.

We claim:

1. A valve system for a water outlet comprising:
   a lever-operated valve having a housing provided with a central axis and formed with said water outlet, at least one water inlet communicating with said housing, a valve member in said housing between said inlet and said outlet, and a control lever swingable on said housing along a path about a pivot axis transverse to said central axis;
   a detent member in said housing formed with a detent opening along an arcuate path of said lever;
   a spring-loaded detent body bearing on said member and engaging in said opening upon displacement of said lever about said pivot axis to a predetermined angular position in opening of said valve; and
   electric circuitry responsive to angular displacement of said lever and including:
      at least one further valve in series with said lever-operated valve for controlling outflow from said outlet,
      an electrical control for said further valve,
      a contactless detector operatively connected to said electrical control for maintaining said further valve open for a duration determined by activation of said detector, and
      a switch in said housing connected with said control for rendering said detector effective in said predetermined angular position of said lever and rendering said detector ineffective in angular positions of said lever other than said predetermined angular position for control of said outflow by said lever-operated valve without limitation by said further valve.

2. The valve system defined in claim 1 wherein said lever-operated valve is a single lever mixing valve wherein said control lever, upon displacement about said central axis, controls a proportion of hot and cold water mixed together before being discharged through said outlet.

3. The valve system defined in claim 1 wherein said switch is actuated through said detent opening by said body.

4. The valve system defined in claim 3 wherein said detent body is a ball, said ball being mounted on said lever.

5. The valve system defined in claim 4 wherein said ball is biased toward said detent opening by a spring received with said ball in a hollow screw threaded in a threaded bore of said lever.

6. The valve system defined in claim 3 wherein said detent member is a plate of a hard material extending along said path and along which said body rides, said detent opening being a bore in said plate and said switch being disposed on a side of said plate opposite said detent body and having an actuating element coaxial with said bore and so positioned that said switch is activated upon passage of a front of said body through said bore via said actuating element.

7. The valve system defined in claim 1 wherein said body engages in said detent opening at a flow rate through said outlet of about 50% of a maximum flow through said valve system.

8. The valve system defined in claim 1 wherein said further valve is an electromagnetically-controlled pilot valve.

9. The valve system defined in claim 8 wherein said further valve is located upstream of said lever-operated valve.

10. The valve system defined in claim 1 wherein said further valve is one of a pair of further valves which open and close synchronously and are connected respectively to cold and hot water supplies for said valve system.

11. The valve system defined in claim 10 wherein said further valves form a twin valve operated by a pilot from said electrical control.

12. The valve system defined in claim 11 wherein said body engages in said detent opening at a flow rate through said outlet of about 50% of a maximum flow through said valve system.

13. The valve system defined in claim 12 wherein said detent member is a plate of a hard material extending along said path and along which said body rides, said detent opening being a bore in said plate and said switch being disposed on a side of said plate opposite said detent body and having an actuating element coaxial with said bore and so positioned that said switch is activated upon passage of a front of said body through said bore via said actuating element.

14. The valve system defined in claim 13 wherein said detent body is a ball biased toward said detent opening by a spring received with said ball in a hollow screw threaded in a threaded bore of said lever.

* * * * *